United States Patent
Kim et al.

(10) Patent No.: US 10,503,174 B1
(45) Date of Patent: Dec. 10, 2019

(54) METHOD AND DEVICE FOR OPTIMIZED RESOURCE ALLOCATION IN AUTONOMOUS DRIVING ON THE BASIS OF REINFORCEMENT LEARNING USING DATA FROM LIDAR, RADAR, AND CAMERA SENSOR

(71) Applicant: Stradvision, Inc., Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Gyeongsangbuk-do (KR); SukHoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongbuk (KR)

( * ) Notice: Subject to any disclaimer, the term of this patent is extended or adjusted under 35 U.S.C. 154(b) by 0 days.

(21) Appl. No.: 16/263,511

(22) Filed: Jan. 31, 2019

(51) Int. Cl.
*G05D 1/02* (2006.01)
*G06T 7/521* (2017.01)
(Continued)

(52) U.S. Cl.
CPC ............ *G05D 1/0221* (2013.01); *B60R 11/04* (2013.01); *G01S 13/931* (2013.01); *G01S 17/936* (2013.01);
(Continued)

(58) Field of Classification Search
CPC .. G05D 1/0221; G05D 1/0251; G05D 1/0248; G05D 1/024; G06N 3/08;
(Continued)

(56) References Cited

U.S. PATENT DOCUMENTS 9,802,599 B2 * 10/2017 Abou-Nasr ........... B60W 10/18
9,977,430 B2 * 5/2018 Shalev-Shwartz ..........................
B60W 30/0953
(Continued)

*Primary Examiner* — Michael J Zanelli
(74) *Attorney, Agent, or Firm* — Husch Blackwell LLP

(57) ABSTRACT

A method for efficient resource allocation in autonomous driving by reinforcement learning is provided for reducing computation via a heterogeneous sensor fusion. This attention-based method includes steps of: a computing device instructing an attention network to perform a neural network operation by referring to attention sensor data, to calculate attention scores; instructing a detection network to acquire video data by referring to the attention scores and to generate decision data for the autonomous driving; instructing a drive network to operate the autonomous vehicle by referring to the decision data, to acquire circumstance data, and to generate a reward by referring to the circumstance data; and instructing the attention network to adjust parameters used for the neural network operation by referring to the reward. Thus, a virtual space where the autonomous vehicle optimizes the resource allocation can be provided by the method.

18 Claims, 4 Drawing Sheets

(51) Int. Cl.
  *G01S 13/93* (2006.01)
  *G01S 17/93* (2006.01)
  *B60R 11/04* (2006.01)
  *G06N 3/08* (2006.01)

(52) U.S. Cl.
  CPC ........... G05D 1/024 (2013.01); G05D 1/0248 (2013.01); G05D 1/0251 (2013.01); G06N 3/08 (2013.01); G06T 7/521 (2017.01); G06T 2207/30261 (2013.01)

(58) Field of Classification Search
  CPC ..... G01S 17/396; G01S 13/931; G06T 7/521; G06T 2207/30261; B60R 11/04
  See application file for complete search history.

(56) References Cited

U.S. PATENT DOCUMENTS

| | | | |
|---|---|---|---|
| 10,019,011 B1 * | 7/2018 | Green | B60W 30/0956 |
| 10,061,316 B2 * | 8/2018 | Nishi | G05D 1/0221 |
| 10,176,388 B1 * | 1/2019 | Ghafarianzadeh | G06K 9/00671 |
| 10,176,596 B1 * | 1/2019 | Mou | G06T 7/80 |
| 2019/0034798 A1 * | 1/2019 | Yu | G06N 3/08 |

* cited by examiner

METHOD AND DEVICE FOR OPTIMIZED RESOURCE ALLOCATION IN AUTONOMOUS DRIVING ON THE BASIS OF REINFORCEMENT LEARNING USING DATA FROM LIDAR, RADAR, AND CAMERA SENSOR

FIELD OF THE DISCLOSURE

The present disclosure relates to a method and a device for use with an autonomous vehicle; and more particularly, to the method and the device for resource allocation in autonomous driving by a reinforcement learning.

BACKGROUND OF THE DISCLOSURE

An autonomous driving system consumes considerable energy, and it is important to minimize consumption of electricity. A camera, one of components of the autonomous driving system, consumes a lot of electricity, and in some cases, e.g., if no obstacles are nearby since an autonomous vehicle with the autonomous driving system is on a road without much traffic, or if no obstacles are present in a certain direction, the number of required cameras may be small. Operation of every camera in such cases wastes a lot of electricity.

Hence, a technique is required to reduce waste of electricity and to efficiently distribute such resources, but a Convolutional Neural Network, i.e., a CNN, cannot implement this because a ground truth, i.e., GT, cannot be well-defined in such cases, and as a result, a loss cannot be well-defined, making learning processes very difficult. Therefore, a reinforcement learning, one of deep learning mechanisms which does not require the GT, can be utilized. But to realize such a technique through the reinforcement learning, some modules must be actually operated. For example, in case of the autonomous driving, a vehicle must be actually driven to perform the reinforcement learning. However, a car crash is much likely to happen during actual driving of the vehicle.

SUMMARY OF THE DISCLOSURE

It is an object of the present disclosure to solve all the aforementioned problems.

It is another object of the present disclosure to provide a method for performing resource allocation efficiently in autonomous driving by a reinforcement learning thus reducing power consumption of an autonomous vehicle.

It is still another object of the present disclosure to provide a virtual space where the autonomous vehicle optimizes the resource allocation by the reinforcement learning thus reducing potential risks in the reinforcement learning.

In accordance with one aspect of the present disclosure, there is provided a method for efficient resource allocation in autonomous driving by reinforcement learning, including steps of: (a) a computing device, if at least one attention sensor data is acquired, instructing an attention network to perform at least one neural network operation by referring to the attention sensor data, to thereby calculate one or more attention scores; (b) the computing device instructing a detection network to acquire at least one video data taken by at least part of one or more cameras installed on an autonomous vehicle by referring to the attention scores and to generate at least one decision data for the autonomous driving by referring to the video data; (c) the computing device instructing a drive network to operate the autonomous vehicle by referring to the decision data, to acquire at least one circumstance data representing a change of circumstance of the autonomous vehicle in operation, and to generate at least one reward by referring to the circumstance data; and (d) the computing device instructing the attention network to adjust at least part of one or more parameters used for the neural network operation by referring to the reward.

As one example, at the step of (a), the neural network operation includes operations of at least one convolutional layer into which the attention sensor data is inputted, at least one pooling layer, at least one FC layer, and at least one softmax layer from which the attention scores are outputted, to thereby determine at least one level of driving risk per each of angle ranges included in space near the autonomous vehicle.

As one example, at the step of (b), the computing device instructs the detection network to acquire a specific video data of a specific camera, installed on the autonomous vehicle, corresponding to a specific angle range having its corresponding attention score equal to or greater than a first threshold.

As one example, at the step of (b), the computing device instructs the detection network to generate the decision data by using the video data where at least one region, corresponding to a specific angle range having its corresponding attention score equal to or greater than a first threshold, is set as at least one ROI.

As one example, at the step of (c), the circumstance data includes at least part of (i) information on whether at least one vehicle horn of at least one nearby vehicle within a certain distance from the autonomous vehicle is in use, (ii) information on a change of speed of said at least one nearby vehicle, and (iii) information on at least one accident between the autonomous vehicle and said at least one nearby vehicle.

As one example, at the step of (a), the attention sensor data is acquired by using one of a radar, a LiDAR, and both of the radar and the LiDAR, and, if the attention sensor data is acquired by the LiDAR or by both of the radar and the LiDAR, the computing device instructs the attention network to generate at least one sparse depth image by referring to three dimensional coordinates included in the attention sensor data, generate at least one dense depth image by applying at least one smoothing operation to the sparse depth image, and perform the neural network operation by referring to the dense depth image, to thereby calculate the attention scores.

As one example, the autonomous vehicle is implemented in a virtual space, and at least part of the parameters are adjusted by a process of driving the autonomous vehicle in the virtual space.

As one example, variations of the attention sensor data, the video data, and the circumstance data are programmed such that the attention sensor data, the video data, and the circumstance data are acquired by referring to information on relations among one or more virtual objects located within a certain distance from the autonomous vehicle in the virtual space.

As one example, the virtual space is programmed to (i) make at least one nearby vehicle in the virtual space to generate its horn if the nearby vehicle within a certain distance from the autonomous vehicle is detected as having a possibility of collision with the autonomous vehicle within a first threshold time, and (ii) make the nearby vehicle to reduce its speed if the nearby vehicle is detected as having a possibility of collision with the autonomous vehicle within a second threshold time, wherein the first threshold time is equal to or greater than the second threshold time.

In accordance with another aspect of the present disclosure, there is provided a computing device for efficient resource allocation in autonomous driving by reinforcement learning, including: at least one memory that stores instructions; and at least one processor configured to execute the instructions to: perform processes of (I) instructing an attention network to perform at least one neural network operation by referring to at least one attention sensor data, to thereby calculate one or more attention scores, (II) instructing a detection network to acquire at least one video data taken by at least part of one or more cameras installed on an autonomous vehicle by referring to the attention scores and to generate at least one decision data for the autonomous driving by referring to the video data, (III) instructing a drive network to operate the autonomous vehicle by referring to the decision data, to acquire at least one circumstance data representing a change of circumstance of the autonomous vehicle in operation, and to generate at least one reward by referring to the circumstance data, and (IV) instructing the attention network to adjust at least part of one or more parameters used for the neural network operation by referring to the reward.

As one example, at the process of (I), the neural network operation includes operations of at least one convolutional layer into which the attention sensor data is inputted, at least one pooling layer, at least one FC layer, and at least one softmax layer from which the attention scores are outputted, to thereby determine at least one level of driving risk per each of angle ranges included in space near the autonomous vehicle.

As one example, at the process of (II), the processor instructs the detection network to acquire a specific video data of a specific camera, installed on the autonomous vehicle, corresponding to a specific angle range having its corresponding attention score equal to or greater than a first threshold.

As one example, at the process of (II), the processor instructs the detection network to generate the decision data by using the video data where at least one region, corresponding to a specific angle range having its corresponding attention score equal to or greater than a first threshold, is set as at least one ROI.

As one example, at the process of (III), the circumstance data includes at least part of (i) information on whether at least one vehicle horn of at least one nearby vehicle within a certain distance from the autonomous vehicle is in use, (ii) information on a change of speed of said at least one nearby vehicle, and (iii) information on at least one accident between the autonomous vehicle and said at least one nearby vehicle.

As one example, at the process of (I), the attention sensor data is acquired by using one of a radar, a LiDAR, and both of the radar and the LiDAR, and, if the attention sensor data is acquired by the LiDAR or by both of the radar and the LiDAR, the processor instructs the attention network to generate at least one sparse depth image by referring to three dimensional coordinates included in the attention sensor data, generate at least one dense depth image by applying at least one smoothing operation to the sparse depth image, and perform the neural network operation by referring to the dense depth image, to thereby calculate the attention scores.

As one example, the autonomous vehicle is implemented in a virtual space, and at least part of the parameters are adjusted by a process of driving the autonomous vehicle in the virtual space.

As one example, variations of the attention sensor data, the video data, and the circumstance data are programmed such that the attention sensor data, the video data, and the circumstance data are acquired by referring to information on relations among one or more virtual objects located within a certain distance from the autonomous vehicle in the virtual space.

As one example, the virtual space is programmed to (i) make at least one nearby vehicle in the virtual space to generate its horn if the nearby vehicle within a certain distance from the autonomous vehicle is detected as having a possibility of collision with the autonomous vehicle within a first threshold time, and (ii) make the nearby vehicle to reduce its speed if the nearby vehicle is detected as having a possibility of collision with the autonomous vehicle within a second threshold time, wherein the first threshold time is equal to or greater than the second threshold time.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained base on the drawings by those skilled in the art of the present disclosure without inventive work.

DETAILED DESCRIPTION OF THE PREFERRED EMBODIMENTS

Figure 1:
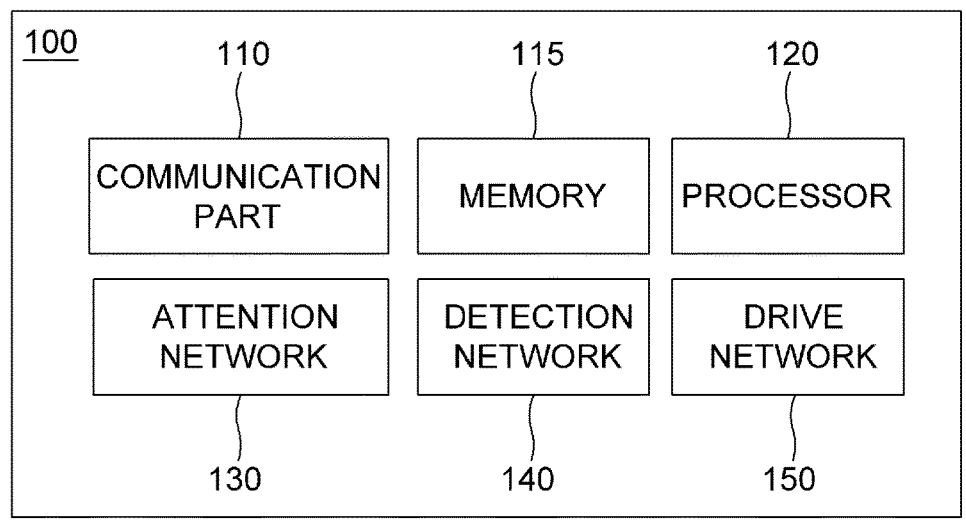
FIG. 1 is a drawing schematically illustrating a configuration of a computing device performing efficient resource allocation in autonomous driving by a reinforcement learning in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

FIG. 1 is a drawing schematically illustrating a configuration of a computing device performing efficient resource allocation in autonomous driving by a reinforcement learning in accordance with one example embodiment of the present disclosure.

By referring to FIG. 1, the computing device 100 may include an attention network 130, a detection network 140, and a drive network 150. Processes of input, output and computation of the attention network 130, the detection network 140, and the drive network 150 may be respectively performed by a communication part 110 and a processor 120. However, detailed communication schematics between the communication part 110 and the processor 120 is omitted in FIG. 1. Herein, a memory 115 may have stored various instructions to be described later, and the processor 120 may execute the instructions stored in the memory 115 and may perform processes of the present disclosure by executing the instructions. Such description of the learning device 100 does not exclude an integrated device including any combination of a processor, a memory, a medium, or any other computing components.

The configuration of the computing device 100 is described above, and by referring to FIG. 2, operations of each of its components are described as follows.

Figure 2:
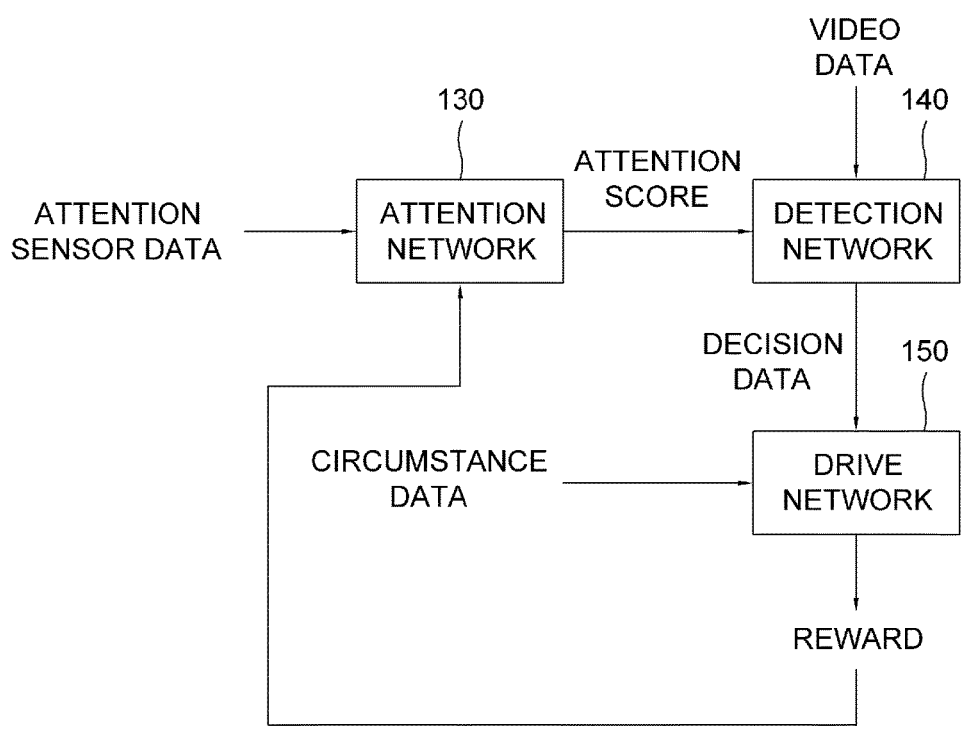
FIG. 2 is a drawing schematically illustrating a process of performing the efficient resource allocation in the autonomous driving by the reinforcement learning in accordance with one example embodiment of the present disclosure.

FIG. 2 is a drawing schematically illustrating processes of the computing device 100 performing the efficient resource allocation in the autonomous driving by the reinforcement learning in accordance with one example embodiment of the present disclosure.

By referring to FIG. 2, the attention network 130 may acquire or support another device to acquire at least one attention sensor data to be described later. The attention network 130 may calculate or support another device to calculate one or more attention scores by using the attention sensor data, and the detection network 140 may perform or support another device to perform processes of acquiring at least one video data taken by at least part of one or more cameras installed on an autonomous vehicle by referring to the attention scores and generating at least one decision data for autonomous driving by referring to the acquired video data. Thereafter, the drive network 150 may perform or support another device to perform processes of operating the autonomous vehicle by referring to the decision data, and acquiring at least one circumstance data representing a change of circumstance of the autonomous vehicle in operation. And the drive network 150 may generate or support another device to generate at least one reward used in the reinforcement learning by referring to the circumstance data. And the attention network 130 may adjust or support another device to adjust at least part of one or more parameters in the neural network operation by referring to the reward.

General flow of the present disclosure is described by referring to FIG. 2, and specific details of the present disclosure is described below.

First, if the attention sensor data is acquired, the computing device 100 may instruct the attention network 130 to perform the neural network operation by referring to the attention sensor data.

Herein, the attention sensor data is data acquired from sensors installed on the autonomous vehicle by using a radar, a LiDAR, or both of the radar and the LiDAR. In case the attention sensor data is generated by using the radar without the LiDAR, the attention network 130 may directly use the data for the neural network operation. However, in case the LiDAR is used, that is, in case the attention sensor data is generated by using both the LiDAR and the radar or by using the LiDAR without the radar, then the data is not optimized for the neural network operation and a pre-processing is needed which is described below.

The attention sensor data of the LiDAR is generated by measuring a distance to a point where a laser light is reflected, along a laser scan line, and includes three dimensional coordinates arranged in concentric circles having the autonomous vehicle as their shared center. The pre-processing uses such 3D coordinates and includes projection and smoothing of the 3D coordinates. Specifically, the projection of the 3D coordinates onto a virtual plane generates a sparse depth image including information on each of the distances of each of pixels. Thereafter, to fill in the interstitial gaps in the sparse depth image, at least one smoothing operation may be applied to the sparse depth image to create a dense depth image. The attention network 130 may perform the neural network operation by referring to the dense depth image.

Figure 3:
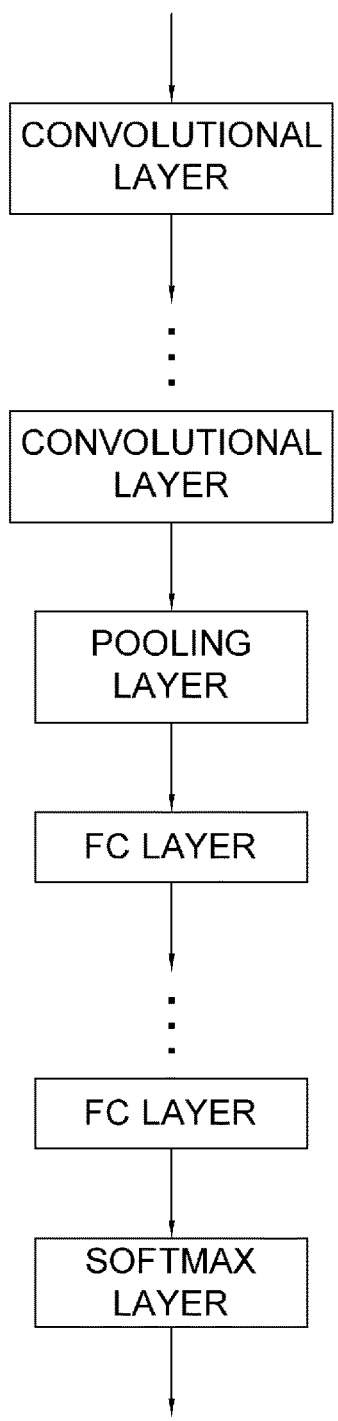
FIG. 3 is a drawing schematically illustrating an example of neural network operations performed for the efficient resource allocation in accordance with one example embodiment of the present disclosure.

The neural network operation performed by the attention network 130 is shown in FIG. 3.

FIG. 3 is a drawing schematically illustrating an example of at least one neural network operation performed for the efficient resource allocation in accordance with one example embodiment of the present disclosure.

By referring to FIG. 3, the neural network operation includes operations of one or more convolutional layers into which the attention sensor data or its pre-processed dense depth image is inputted, at least one pooling layer which applies at least one pooling operation to a result of the convolutional layer, one or more FC layers which apply one or more fully connected operations to a result of the pooling layer, and at least one softmax layer from which the attention scores are outputted. Apparently, the configuration shown in FIG. 3 is just an example, and it should be noted that each of the layers may be replaced with one or more different layers, that at least one different layer may be added to the example, or that a certain layer may be removed.

Such the neural network operation may be applied to determine at least one level of driving risk per each of angle ranges included in space near the autonomous vehicle, to thereby output the attention scores. The driving risk is described in detail by referring to FIG. 4.

Figure 4:
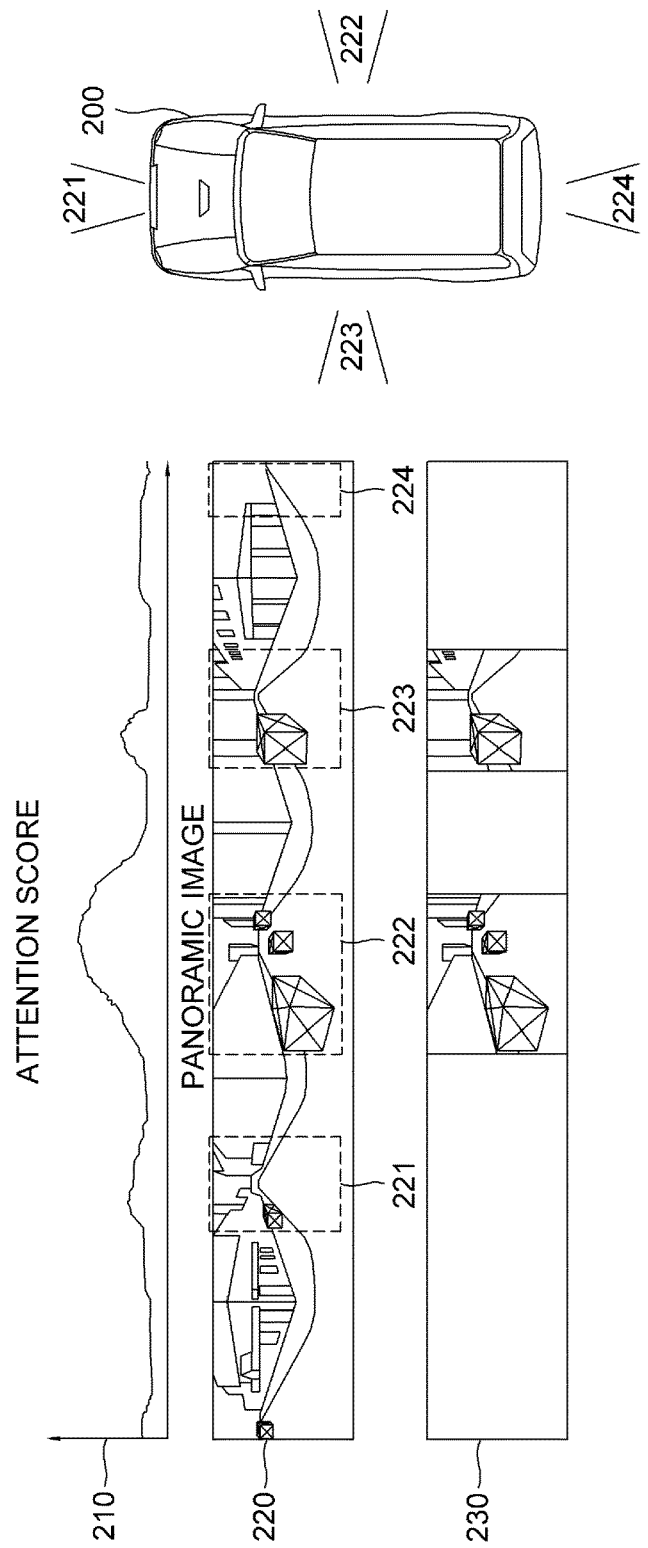
FIG. 4 is a drawing schematically illustrating an example of attention scores calculated for performing the efficient resource allocation in accordance with one example embodiment of the present disclosure.

FIG. 4 is a drawing schematically illustrating an example of the attention scores calculated for performing the efficient resource allocation in accordance with one example embodiment of the present disclosure.

By referring to FIG. 4, some of the attention scores 210 corresponding to some specific directions where many objects are determined as located on a panoramic image 220 representing the space near the autonomous vehicle 200 are shown to have high values. The panoramic image 220 is shown for convenience of understanding, and in reality, the attention scores, not the panoramic image 220, are generated by using the dense depth image or using the attention sensor data generated by the radar. In the exemplary attention scores 210 of FIG. 4, said some of the attention scores corresponding to said some specific directions of 222 and 223 are shown to be high. That is, if many objects are detected in the specific directions, there are possibilities that one or more of the objects may move toward the autonomous vehicle 200 or that potential risks may rise, thus the levels of driving risk in those directions are determined as high and the attention scores of the angle ranges corresponding to those directions are calculated to be high. The effect of the attention scores 210 calculated by the detection network 140 is described later by referring to FIG. 4.

If the attention scores are calculated, the computing device 100 may instruct the detection network 140 to acquire at least one video data taken by at least part of one or more cameras installed on the autonomous vehicle 200 by referring to the attention scores, and generate at least one decision data for the autonomous driving by referring to the video data.

That is, at least part of the cameras installed on the autonomous vehicle is selected, and computation is performed by using videos taken by said at least part of the cameras, to thereby minimize power consumption used by the cameras compared to using all of the cameras. Herein, it is helpful to use the videos of said at least part of the cameras corresponding to some directions where attention is needed according to the potential risks, and the attention scores are used for this purpose.

That is, by referring to FIG. 4, the attention scores in the directions of 222 and 223 are high, and thus the video data from the cameras recording in the directions of 222 and 223 of the autonomous vehicle 200 are acquired. The attention scores as a criterion for which cameras should be selected may be based on whether their corresponding attention scores are larger than a first threshold. That is, the detection network 140 may acquire specific video data generated by specific cameras, installed on the autonomous vehicle 200, corresponding to specific angle ranges having their corresponding attention scores equal to or greater than the first threshold.

Or the attention scores may be used to determine at least one ROI, i.e., region of interest. By referring to FIG. 4 again, although the video data per se are acquired from every camera, images in the directions having high levels of the driving risk may be determined as sources for one or more ROIs when determining which ROIs will be used for actual computational operations, as shown in an ROI panoramic image 230. That is, the detection network 140 may perform subsequent processes on condition that one or more regions, corresponding to the specific angle ranges having the attention scores equal to or greater than the first threshold, have been set as the ROIs.

The present disclosure has an effect of reducing a computational load on the detection network 140 and the drive network 150, by selecting the video data of said at least part of the cameras or by setting the ROIs on the images. After these processes for reducing the computational load are performed, the detection network 140 may generate the decision data for the autonomous driving by referring to the video data taken by at least part of the cameras, or by referring to the ROIs set on at least part of the video data.

The detection network 140 may detect the objects on the images included in the video data, calculate their distances and/or their positions serving as the decision data, and determine at least one route for the autonomous vehicle 200 based thereon. The detection network 140 may generate the decision data for the autonomous driving, but since a main point of the present disclosure is the reinforcement learning method for the efficient resource allocation, details of the generation of the decision data is omitted.

If the decision data is generated, the computing device 100 may instruct the drive network 150 to operate the autonomous vehicle 200 by referring to the decision data, to acquire at least one circumstance data representing a change of circumstance of the autonomous vehicle 200 in operation, and to generate at least one reward according to the reinforcement learning by referring to the circumstance data.

The drive network 150 may drive the autonomous vehicle 200 along said at least one route included in the decision data. The process of driving the autonomous vehicle 200 by the drive network 150 is omitted since it is not the main point of the present disclosure.

The autonomous vehicle 200 may acquire the circumstance data representing the change of circumstance of the autonomous vehicle 200 in operation. The circumstance data may include at least part of (i) information on whether at least one vehicle horn of at least one nearby vehicle within a certain distance from the autonomous vehicle 200 is in use, (ii) information on a change of speed of said at least one nearby vehicle, and (iii) information on at least one accident between the autonomous vehicle and said at least one nearby vehicle. The drive network 150 may generate the reward by referring to the circumstance data, and this means adjusting the processes by referring to such information since the reward takes part in adjusting the parameters of the neural network operation.

The information on use of the horns, the change of speed and the accidents may be criteria for determining whether the autonomous vehicle 200 is being driven safely. That is because, if the autonomous vehicle 200 is being driven safely, the nearby vehicles will not sound their horns, will not reduce their speed, and will not collide with the autonomous vehicle 200. If incidents like sounding horns, speed reduction, and car crashes occur, the drive network 150 may lower the reward to force the autonomous vehicle 200 to drive more safely. Its detail is described below.

The computing device 100 may instruct the attention network 130 to adjust the parameters to be used for the neural network operation by referring to the reward. The attention network 130 may determine which way the parameters will change according to the reward, and as one example, if the reward is unattractive, the attention network 130 may use the video data of more cameras and may set the ROIs to be broader to enable the detection network 140 to examine a broader range of areas, to thereby allow a safer driving. As another example, the parameters may be adjusted such that the attention scores will be higher in general. This is an algorithm executing procedure of the reinforcement learning, which enables efficient use of the cameras and the safer driving.

The present disclosure as above has several advantages, however, the learning process in accordance with the present disclosure must be performed during actual driving on a road, as opposed to a process of general learning process of the CNN into which prepared training images are simply inputted. That is, in case of the example above in accordance with the present disclosure, if the learning process is not executed well enough, a probability of car crashes may become very high when driving actually on the road. Accordingly, in another example of the present disclosure, the learning process in a virtual space is proposed as a solution to the above problem. Details are as follows.

The autonomous vehicle 200 and at least one nearby vehicle within a certain distance from the autonomous vehicle 200 may be programmed to exist in the virtual space. Herein, the attention sensor data, the video data, and the circumstance data that can be acquired by the autonomous vehicle 200 may be programmed to be acquired using information on relations among virtual objects located near the autonomous vehicle 200 in the virtual space. In case of the attention sensor data, since distances in the virtual space between the autonomous vehicle 200 and the nearby virtual objects are easily calculated, the attention sensor data may be generated similarly to a format of the data generated by the radar or the LiDAR, and the video data may also be generated similarly to a real-world data by creating images according to the point of view within the virtual space. The circumstance data may also be generated similarly. To that end, additional logic for nearby virtual vehicles is needed, and this is described as follows.

For acquisition of the circumstance data, the logic of the nearby virtual vehicles sounding their horns and reducing their speed must be programmed in advance. Specifically, the virtual space may be programmed to (i) make at least one nearby vehicle within a certain distance from the autonomous vehicle 200 in the virtual space generate its horn if the nearby vehicle is detected as having a possibility of collision with the autonomous vehicle 200 within a first threshold time, and (ii) make the nearby vehicle reduce its speed if the nearby vehicle is detected as having a possibility of collision with the autonomous vehicle 200 within a second threshold time. Herein, the first threshold time may be equal to or greater than the second threshold time, because a driver will sound the horn to avoid reducing the speed of his or her vehicle. Apparently, this is just one of example embodiments, and the first threshold time and the second threshold time may be set arbitrarily.

If the logic for the nearby virtual vehicles are implemented as such, the circumstance data may be acquired similarly to that of real-world cases. The autonomous vehicle 200 may be implemented in the virtual space as such, and may be learned by adjusting the parameters used for the neural network operation during a process of driving the autonomous vehicle in the virtual space. Upon implementation of the learning processes as above, environments similar to the real-world cases may be implemented in the virtual space, therefore a safe learning without any accidents, such as a traffic jam, driving on a winding road or on a road on hills, may be performed for various situations in the virtual space.

As can be understood by those skilled in the art, it is clear that communication parts of the computing device may perform transmission of image data, for example, images described above like the original image, original labels, and additional labels, etc., and that processors and/or memories of the computing device may retain data for feature maps and performing operations, and that the processors of the computing device may perform convolution operations, deconvolution operations, and loss value operations, but the scope of the present disclosure is not limited thereto.

The present disclosure has an effect of providing a method for performing the efficient resource allocation in the autonomous driving by the reinforcement learning thus reducing the power consumption of the autonomous vehicle.

The present disclosure has another effect of providing the virtual space where the autonomous vehicle optimizes the resource allocation by the reinforcement learning thus reducing potential risks during the learning process.

This attention-based method may be provided to be used for reducing computation. Further, a heterogeneous sensor fusion may be used to perform the method of the present disclosure.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for efficient resource allocation in autonomous driving by reinforcement learning, comprising steps of:
   (a) a computing device, if at least one attention sensor data is acquired, performing at least one neural network operation by referring to the attention sensor data, to thereby calculate one or more attention scores;
   (b) the computing device acquiring at least one video data taken by at least part of one or more cameras installed on an autonomous vehicle by referring to the attention scores and to generate at least one decision data for the autonomous driving by referring to the video data;
   (c) the computing device operating the autonomous vehicle by referring to the decision data, to acquire at least one circumstance data representing a change of circumstance of the autonomous vehicle in operation, and to generate at least one reward by referring to the circumstance data; and
   (d) the computing device adjusting at least part of one or more parameters used for the neural network operation by referring to the reward.

2. The method of claim 1, wherein, at the step of (a), the neural network operation includes operations of at least one convolutional layer into which the attention sensor data is inputted, at least one pooling layer, at least one FC layer, and at least one softmax layer from which the attention scores are outputted, to thereby determine at least one level of driving risk per each of angle ranges included in space near the autonomous vehicle.

3. The method of claim 1, wherein, at the step of (b), the computing device acquires a specific video data of a specific camera, installed on the autonomous vehicle, corresponding to a specific angle range having its corresponding attention score equal to or greater than a first threshold.

4. The method of claim 1, wherein, at the step of (b), the computing device generates the decision data by using the video data where at least one region, corresponding to a specific angle range having its corresponding attention score equal to or greater than a first threshold, is set as at least one ROI.

5. The method of claim 1, wherein, at the step of (c), the circumstance data includes at least part of (i) information on whether at least one vehicle horn of at least one nearby vehicle within a certain distance from the autonomous vehicle is in use, (ii) information on a change of speed of said at least one nearby vehicle, and (iii) information on at least one accident between the autonomous vehicle and said at least one nearby vehicle.

6. The method of claim 1, wherein, at the step of (a), the attention sensor data is acquired by using one of a radar, a LiDAR, and both of the radar and the LiDAR, and
   wherein, if the attention sensor data is acquired by the LiDAR or by both of the radar and the LiDAR, the computing device generates at least one sparse depth image by referring to three dimensional coordinates included in the attention sensor data, generates at least one dense depth image by applying at least one smoothing operation to the sparse depth image, and performs the neural network operation by referring to the dense depth image, to thereby calculate the attention scores.

7. The method of claim 1, wherein the autonomous vehicle is implemented in a virtual space and wherein at least part of the parameters are adjusted by a process of driving the autonomous vehicle in the virtual space.

8. The method of claim 7, wherein variations of the attention sensor data, the video data, and the circumstance data are programmed such that the attention sensor data, the video data, and the circumstance data are acquired by referring to information on relations among one or more virtual objects located within a certain distance from the autonomous vehicle in the virtual space.

9. The method of claim 7, wherein the virtual space is programmed to (i) make at least one nearby vehicle in the virtual space to generate its horn if the nearby vehicle within a certain distance from the autonomous vehicle is detected as having a possibility of collision with the autonomous vehicle within a first threshold time, and (ii) make the nearby vehicle to reduce its speed if the nearby vehicle is detected as having a possibility of collision with the autonomous vehicle within a second threshold time, and wherein the first threshold time is equal to or greater than the second threshold time.

10. A computing device for efficient resource allocation in autonomous driving by reinforcement learning, comprising:
    at least one memory that stores instructions; and
    at least one processor configured to execute the instructions to: perform processes of (I) performing at least one neural network operation by referring to at least one attention sensor data, to thereby calculate one or more attention scores, (II) acquiring at least one video data taken by at least part of one or more cameras installed on an autonomous vehicle by referring to the attention scores and to generate at least one decision data for the autonomous driving by referring to the video data, (III) operating the autonomous vehicle by referring to the decision data, to acquire at least one circumstance data representing a change of circumstance of the autonomous vehicle in operation, and to generate at least one reward by referring to the circumstance data, and (IV) adjusting at least part of one or more parameters used for the neural network operation by referring to the reward.

11. The computing device of claim 10, wherein, at the process of (I), the neural network operation includes operations of at least one convolutional layer into which the attention sensor data is inputted, at least one pooling layer, at least one FC layer, and at least one softmax layer from which the attention scores are outputted, to thereby determine at least one level of driving risk per each of angle ranges included in space near the autonomous vehicle.

12. The computing device of claim 10, wherein, at the process of (II), the processor acquires a specific video data of a specific camera, installed on the autonomous vehicle, corresponding to a specific angle range having its corresponding attention score equal to or greater than a first threshold.

13. The computing device of claim 10, wherein, at the process of (II), the processor generates the decision data by using the video data where at least one region, corresponding to a specific angle range having its corresponding attention score equal to or greater than a first threshold, is set as at least one ROI.

14. The computing device of claim 10, wherein, at the process of (III), the circumstance data includes at least part of (i) information on whether at least one vehicle horn of at least one nearby vehicle within a certain distance from the autonomous vehicle is in use, (ii) information on a change of speed of said at least one nearby vehicle, and (iii) information on at least one accident between the autonomous vehicle and said at least one nearby vehicle.

15. The computing device of claim 10, wherein, at the process of (I), the attention sensor data is acquired by using one of a radar, a LiDAR, and both of the radar and the LiDAR, and wherein, if the attention sensor data is acquired by the LiDAR or by both of the radar and the LiDAR, the processor generates at least one sparse depth image by referring to three dimensional coordinates included in the attention sensor data, generates at least one dense depth image by applying at least one smoothing operation to the sparse depth image, and performs the neural network operation by referring to the dense depth image, to thereby calculate the attention scores.

16. The computing device of claim 10, wherein the autonomous vehicle is implemented in a virtual space and wherein at least part of the parameters are adjusted by a process of driving the autonomous vehicle in the virtual space.

17. The computing device of claim 16, wherein variations of the attention sensor data, the video data, and the circumstance data are programmed such that the attention sensor data, the video data, and the circumstance data are acquired by referring to information on relations among one or more virtual objects located within a certain distance from the autonomous vehicle in the virtual space.

18. The computing device of claim 16, wherein the virtual space is programmed to (i) make at least one nearby vehicle in the virtual space to generate its horn if the nearby vehicle within a certain distance from the autonomous vehicle is detected as having a possibility of collision with the autonomous vehicle within a first threshold time, and (ii) make the nearby vehicle to reduce its speed if the nearby vehicle is detected as having a possibility of collision with the autonomous vehicle within a second threshold time, and wherein the first threshold time is equal to or greater than the second threshold time.

* * * * *